Patented Oct. 26, 1926.

1,604,574

UNITED STATES PATENT OFFICE.

MAJOR E. HOLMES AND GAIL J. FINK, OF WASHINGTON, DISTRICT OF COLUMBIA, ASSIGNORS TO NATIONAL LIME ASSOCIATION, OF WASHINGTON, DISTRICT OF COLUMBIA, A CORPORATION OF THE DISTRICT OF COLUMBIA.

QUICK-SETTING LIME PRODUCTS.

No Drawing. Application filed May 16, 1923. Serial No. 639,446.

Our invention relates to the production of plastic materials which have quick initial setting properties and which are adapted to be used in the making of mortars, plasters, shaped articles such as blocks and the like.

The use of calcined gypsum for plastering purposes is well known. Gypsum sets so quickly that it is necessary to add varying proportions of a retarding agent to delay the set sufficiently to allow the workmen time to get the plaster on the wall. In addition to this objection, gypsum has a number of other serious objections and disadvantages. For example, the material is difficult to work, owing to its lack of plasticity and, as compared to lime, its low sand-carrying capacity. Large quantities of lime are used for plastering purposes but this material has one serious disadvantage namely, it is necessary to wait a considerable period of time—twenty to twenty-four hours—for each coat to acquire, what may be termed its initial set, by which it becomes sufficiently strong, firm and dry so that the succeeding coat may be applied. This is quite a serious objection since it requires the removal of scaffolds from one room to another between the application of the various coats, if the workmen are not to suspend work entirely.

We have found that quick initial setting properties may be imparted to plastic materials such as lime and thereby the latter may be successfully used for palstering purposes and for the production of mortars, blocks and the like. We have found that by mixing with ordinary hydrated lime or lime putty varying percentages of such inorganic sulphates, preferably finely ground, as will react with lime after being mixed with water to form relatively insoluble compounds, the resulting product acquires quick initial setting properties. Various inorganic sulphates of the type referred to may be used but we have secured the best results with manganese sulphate and ferric and ferrous sulphates. Other sulphates which may be used are those of magnesium, nickel, cobalt, chromium, cadmium, and zinc. These sulphates are typical of those which do not produce an efflorescing compound in reaction with lime. Sodium sulphate is typical of those which produce efflorescence and for this reason is not very desirable.

The term "initial set" is used to indicate that condition of the lime plaster which makes it suitable for the application of the second or brown coat. It is not necessarily hard in this condition, but is firm, strong and rigid enough to support the weight of the second coat and withstand the pressure necessary in the application of the second coat. This is distinguished from the term "hardening" in that the latter refers to the condition of the mortar after it has undergone practically all the physical and chemical changes that it will undergo and has developed a strength near its maximum strength.

Ordinarily, lime mortar does not harden to the final condition of hardness for a great many months and in some cases a number of years, whereas the initial set occurs in about 20 hours when using standard sanded lime mortar, and in our motar, the initial set is so quickened as to occur in 9 hours and in some cases, in even less time. The term "quick initial set" is used to distinguish between slow setting hydrated lime which requires about 20 hours to acquire its initial set and our material which sets in less than half of this time. We do not desire to set any definite limit as to the time it takes our material to acquire its initial set as this will depend on the character of the lime and the type and percentage of soluble sulphates used. The term "set" is sometimes used indiscriminately as synonymous with hardness. When so used, it is of course clear, that the final hardness of the material is referred to.

We have used the standard Gillmore needle in testing for the set of lime mortar. We find that when the large Gillmore needle penetrates to a distance of 2 mm. in the pat the mortar has assumed its set, that is it is in a condition to receive the second coat. This relation between the penetration of the needle and its suitability for the second coat, has been checked up by practical plasterers.

As a specific example, illustrative of our invention, the following is given: A suitable plaster may be prepared by mixing 5 parts of dry manganese sulphate, such as $MnSO_4 \cdot 7H_2O$, with 95 parts of hydrated lime and adding one part of this mixture to 5 parts by weight of sand and the requisite amount of water. Such a plaster will set sufficiently in 9 hours to permit the application of a second coat. A similar plaster to which manganese sulphate has not been added will require 20 hours to set and to dry to the same degree. A similar plaster made by using a mixture containing 10% of ferrous sulphate (FeSO$_4$, 7H$_2$O) will set in 8 hours. The time of set may be increased or decreased by regulating the quantity of the addition agent. It may be desirable for certain purposes to retard the time of set and this may be accomplished by the addition of suitable retarders such as glue, casein, dried blood, ground tankage and the like. The following gives in tabular form the time of set obtained in comparative tests, with and without the addition agents:

| Addition agent. | Per cent, addition agent. | Time of set. | |
|---|---|---|---|
| | | Hrs. | Mins. |
| None (lime alone) | None. | 20 | 00 |
| MnSO$_4$ | 5 | 9 | 00 |
| FeSO$_4$ | 10 | 8 | 00 |
| Fe$_2$(SO$_4$)$_3$ | 5 | 9 | 00 |
| Prepared gypsum plaster | | 9 | 50 |

In the above example, the materials forming the plaster mix are mixed in a dry state and there is no reaction between mix constituents until after water is added. This mode of procedure is important as will be hereinafter pointed out. The accelerating agent, hydrated lime, and other ingredients may be mixed at the place of manufacture and thereby a prepared dry plaster mix sent to the trade which requires only the addition of water to be immediately available for use.

However, the addition of the accelerating agent to quicklime putty, or hydrated lime putty to form a quick setting mixture at the point of use may be carried out as follows: Quicklime is slaked with the required amount of water to produce a putty which is allowed to cool, or hydrated lime is mixed with the required amount of water to form a putty. If the neat putty is to be used an amount of finely divided accelerating agent, for example manganese sulphate, equivalent to 5% of the weight of the hydrate is thoroughly mixed with the putty. In case a sanded mortar or plaster is to be made, it is best to thoroughly mix the accelerating agent with the sand before it is added to the putty. Or, if desired, the inorganic sulphate to be added may be dissolved in water before adding to the putty.

Proceeding according to either example there is no substantial reaction between the constituents until sometime after the water is added. The substances being of such a nature that they are slowly soluble in an alkaline medium, the reaction between the lime and sulphate progresses slowly, and consequently no setting action is apparent within such a time as to permit the placing of the mortar or plaster in place in the joint or on the surface to be plastered. Ultimately, however, after the plaster is in place, the reaction does progress to such an extent as to produce the setting action. We do not desire to be limited by any theory as to what occurs, as the action is quite complex, consisting of several reactions, each of which contributes in part to the final results. The soluble sulphate added reacts with the hydrated lime to form calcium sulphate and an insoluble hydroxide. The calcium sulphate thus formed hydrates and a certain amount of setting is produced by the crystallization of this material, accompanied also by a certain amount of drying action. The insoluble hydroxide being finely disseminated throughout the mass, probably catalyzes the carbonation of that portion of the lime with which the sulphate has not reacted. It is also probable that a portion of the lime and the sulphate will react to form complex salts capable of holding a very large amount of water of crystallization as compared with that of hydrated calcium sulphate. The effect of the formation of such compounds would be a setting action due to the crystallization in part and a drying out due to the taking up of the free water.

It has been proposed to add addition agents to lime to produce certain results, but as far as we are aware, our addition agents have not been added in the way and for the purpose we add them. Thus, it has been proposed to slake quicklime with a solution of iron sulphate. In all such cases, the reaction described above, which it is desired to have take place after the mortar or plaster is put into place has already taken place almost completely before the mortar or plaster is prepared and its effect, in so far as the setting up of the finished plaster is concerned, is entirely lost. The result is the same as that which would be obtained by tempering a gypsum plaster which has already taken its set. The material would already have been hydrated and would not have any further setting properties.

It is obvious that together with the inorganic sulphates other addition agents may be added to confer desirable properties upon the finished product. For example, in certain cases, it may be desirable to control the shrinkage or expansion of the plastic material. As an illustration, for certain kinds of masonary work, it may be desirable to make a very strong mortar, and in that case Portland cement may be added to the lime and sulphate mix. Again, it may be desirable to make very dense products which may be accomplished by the shrinkage resulting from the addition of lead compounds, in connection with the use of addition agents to eliminate the efflorescense, if necessary.

The term "hydrated lime" as used in the specification and claims includes the various kinds of commercial hydrated lime which may vary considerably in its composition. It is intended to include thereunder both calcium and dolomitic hydrated lime. In addition, we intend to cover by this term dry hydrated lime which is a definite article of commerce or lime putty which may be made from dry hydrated lime or from quick lime.

The element, manganese, has an atomic weight of 55 and iron has an atomic weight of 56. In the claims the phrase, "the atomic weight of the metal being approximately 56" is intended to cover either manganese or iron. Iron, cobalt, nickel and chromium have atomic weights running between 52 and 59 and in the claims it is intended, in general, to cover by the phrase, "the atomic weight of the metal being between 52 and 59" the use of sulphates containing these metals.

In the periodic table, magnesium, zinc and cadmium appear in group 2, chromium in group 6, manganese in group 7, and iron, cobalt and nickel in group 8. In the claims the term, "embraced within groups 2, 6, 7 and 8 of the periodic table", is intended to cover generically the above specified metals.

We claim:

1. A non-argillaceous plastic material having quick initial setting properties comprising substantially commercially pure hydrated lime, prepared by slaking with water, and a soluble sulphate of a metal embraced within groups 2, 6, 7 and 8 of the periodic table, reacting principally upon the hydrated lime to produce the quick setting properties.

2. A non-argillaceous plastic material having quick initial setting properties containing substantially commercially pure hydrated lime, prepared by slaking with water, and a soluble sulphate of a metal embraced within groups 2, 6, 7 and 8 of the periodic table reacting principally with the hydrated lime to form an insoluble compound.

3. A non-argillaceous plastic material having quick initial setting properties comprising substantially commercially pure hydrated lime, prepared by slaking with water, and a soluble sulphate of a metal, the atomic weight of the metal being between 52 and 59, said sulphate reacting principally upon the hydrated lime to produce the quick setting properties.

4. A plastic material having quick initial setting properties comprising hydrated lime and manganese sulphate.

5. A prepared non-argillaceous plaster mix having quick initial setting properties comprising substantially commercially pure hydrated lime, prepared by slaking with water, and a soluble metallic sulphate embraced within groups 2, 6, 7 and 8 of the periodic table, said sulphate reacting principally upon the hydrated lime to produce the quick setting properties.

6. A prepared plaster mix having quick initial setting properties comprising hydrated lime and manganese sulphate.

7. A prepared dry non-argillaceous plaster mix having quick initial setting properties comprising substantially commercially pure hydrated lime, prepared by slaking with water, and a soluble sulphate of a metal embraced within groups 2, 6, 7 and 8 of the periodic table.

8. A prepared dry plaster mix having quick initial setting properties comprising hydrated lime and manganese sulphate.

9. A prepared non-argillaceous plaster mix having quick initial setting properties substantially commercially pure comprising hydrated lime, prepared by slaking with water, and a soluble sulphate of metal embraced within groups 2, 6, 7 and 8 of the periodic table reacting principally with the hydrated lime to form an insoluble compound.

10. A prepared non-argillaceous plaster mix having quick initial setting properties comprising substantially commercially pure hydrated lime, prepared by slaking with water, and a soluble sulphate of a metal, the atomic weight of the metal being between 52 and 59, said sulphate reacting principally upon the hydrated lime to produce the quick setting properties.

11. A plastic non-argillaceous material having quick initial setting properties comprising substantially commercially pure hydrated lime, prepared by slaking with water, a retarder and a soluble metal sulphate embraced within groups 2, 6, 7 and 8 of the periodic table, said sulphate reacting principally upon the hydrated lime to produce the quick setting properties.

12. A plastic non-argillaceous material having quick initial setting properties comprising substantially commercially pure hydrated lime, prepared by slaking with water, a retarder and a soluble sulphate of a metal, the atomic weight of the metal being between 52 and 59, said sulphate reacting principally upon the hydrated lime to produce the quick setting properties.

13. The process of producing a plastic material having quick initial setting properties comprising mixing hydrated lime with a soluble sulphate of a metal embraced within groups 2, 6, 7 and 8 of the periodic table in the presence of water.

14. The process of producing a material which initially sets quickly comprising mixing hydrated lime with a soluble sulphate of a metal embraced within groups 2, 6, 7 and 8 of the periodic table in the presence of water and allowing the product to set.

15. The process of producing a plastic material having quick initial setting properties comprising mixing hydrated lime with a soluble sulphate of a metal having an atomic weight between 52 and 59 in the presence of water.

16. The process of producing a plastic material having quick initial setting properties comprising mixing hydrated lime with manganese sulphate in the presence of water.

17. The process of producing a plastic material having quick initial setting properties comprising mixing hydrated lime in the presence of water with such a quantity of a soluble sulphate of a metal embraced within groups 2, 6, 7 and 8 of the periodic table as will confer upon the resulting product quick setting properties.

In testimony whereof they hereunto affix their signatures.

MAJOR E. HOLMES.
GAIL J. FINK.